(No Model.)

A. L. KRAUS.
COMBINED FENDER AND BRAKE MECHANISM.

No. 574,097. Patented Dec. 29, 1896.

Witnesses:
Joseph F. Milano.
M. Dorian

Inventor:
Albert L. Kraus;
L. V. Bacon
By
Att'y.

UNITED STATES PATENT OFFICE.

ALBERT L. KRAUS, OF PEABODY, MASSACHUSETTS.

COMBINED FENDER AND BRAKE MECHANISM.

SPECIFICATION forming part of Letters Patent No. 574,097, dated December 29, 1896.

Application filed April 9, 1896. Serial No. 586,800. (No model.)

*To all whom it may concern:*

Be it known that I, ALBERT L. KRAUS, a citizen of the United States, residing at Peabody, in the county of Essex and State of Massachusetts, have invented a certain new and useful Improvement in a Combined Fender and Brake Mechanism; and I do hereby declare the following to be a full, clear, and exact description of the invention, such as will enable others skilled in the art to which it appertains to make and use the same.

This invention relates to an improvement in car-fenders, and more particularly to that class of fenders wherein mechanism is employed for setting the brakes and cutting off the motive power upon the depression of the fender proper as the same is struck by an object.

The invention is embodied in the construction and arrangement of apparatus hereinafter described, and definitely pointed out in the claims.

The main purpose of the invention is to simplify the construction of devices of the character above indicated, to form positive mechanism for setting the brakes, and to employ motive power for such mechanism which is derived from the motion of the car, and to interpose suitable connections between the fender proper and the brake mechanism for governing the latter, and for automatically closing the circuit when the apparatus is used in connection with an electric railway.

The objects of the invention are attained by the construction illustrated in the accompanying drawings, wherein like letters of reference indicate corresponding parts in the several views, and in which—

Figure 1:
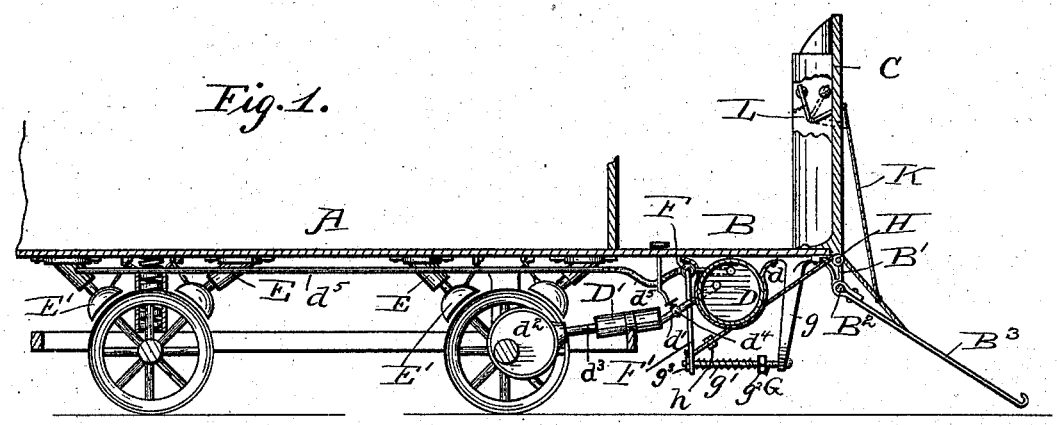
Figure 2:
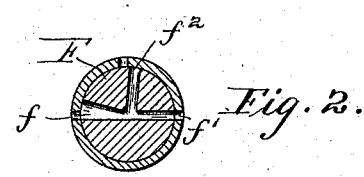
Figure 3:
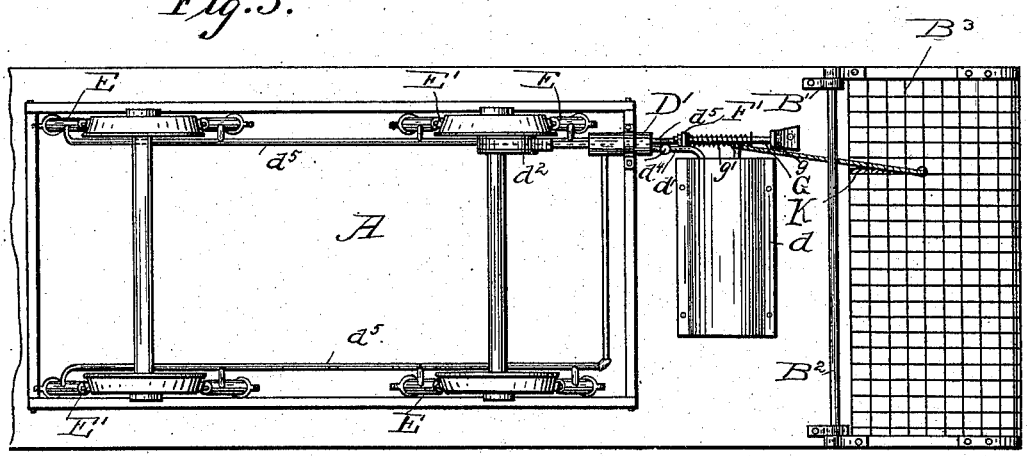

Figure 1 is a longitudinal section. Fig. 2 is a detail view of the valve, and Fig. 3 represents a bottom plan view.

In the drawings, A represents the body of the car; B, the platform; C, the dash, of any conventional style or form. At the front of the platform are the depending brackets $B'$, in the lower ends of which are formed bearings in which the supporting-rod $B^2$ is placed, the same carrying the fender $B^3$, which is thereby hinged to have a vertical swinging motion.

On the under side of the platform is secured the air-cylinder D, supported by suitable brackets $d$. This cylinder has communicating therewith a pipe $d'$, leading from an air-pumping cylinder $D'$, mounted on the truck. This pump $D'$ serves to compress the air and force it into the cylinder D and the piston thereof is actuated through the instrumentality of an eccentric $d^2$, mounted on the wheel-axle, the strap of the eccentric being connected with a pump piston-rod $d^3$. The valve mechanism for the pump I have not shown, as it is to be understood that any of the conventional forms of valves may be employed. In the pipe leading from the pump to the cylinder I have placed a valve $d^4$, which is controlled by a suitable connection leading to the platform. The valve has a port leading to the exterior, so that as the cylinder D is filled to the desired pressure the drag of the piston may be avoided by allowing the air to escape through the valve $d^4$. Any other form of device may be employed, however, for securing this result.

E designates the brake-cylinders, supported on the truck and arranged diagonally relative to the upper surface of the wheels. These cylinders are fixed in their positions, and each communicates with the storage-tank D through the instrumentality of the pipe $d^5$, there being an interposed section of flexible hose in the pipe-line to permit of the necessary vertical movement or play between the cylinder D and the truck. The brake-cylinders E are provided with pistons of any convenient form, the rods of which carry the brake-shoes $E'$, bearing on the upper face of the wheels when pressure is applied.

In the main lead from the cylinder D to the supply-pipes for the brake-cylinders is a three-way valve F, located in a casing, having ports $f f'$ communicating with the pipe and the port $f^2$ leading to the exterior of the casing. By this means when the valve is turned in one direction it will form a communication between the cylinder D and the brake-cylinders, while a reverse movement will open the port $f'$ to the exterior port and allow the air to escape from the brake-cylinder. To provide means for actuating this valve F by the movement of the fender, I connect to the stem thereof a depending lever $F'$, the lower end of which is perforated and receives a horizontal rod G, supported in a suitable depending bracket $g$ upon the platform. The rod G has sleeved on its lower portion a spring $g'$, the tension of which is regulated by a nut $g^2$ on the forward end of the rod, and a stop-nut $g^3$ is placed on the opposite side of the depending lever. By this means the spring will have a tendency to normally hold the lever in position to open the port leading from the brake-cylinder pipe to the exterior port of the valve casing, and thereby maintain the brakes in an inactive position.

To shift the ports of the valve F, a flexible rope or cable is attached to the lever F' near its lower end, the same being extended up over a pulley H on the platform, and from thence down to and connected with the fender by any suitable means. The fender is, by means of the rope, held in its proper elevated position, the tension of the spring $g'$ being sufficient under ordinary circumstances to maintain the fender in its position until the latter is struck by some foreign object, in which case the fender will be forced down, compressing the spring and allowing the air to escape from the storage-cylinder to the brake-cylinders by shifting the valve F, the necessary adjustments for accurate working being governed by the nut on the rod G and through the instrumentality of a turnbuckle or other convenient device $h$, located in the cord or cable.

K designates a branch cord or chain leading from the fender-cord up to a switch L, of any convenient form, so that upon the depression of the fender to an extent sufficient to actuate the valve F the switch will be actuated to cut off the current from the motor.

While I have shown and described special details of construction, I desire to have it understood that I do not consider myself limited to such details, as many minor changes can be made without departing from the nature or principles of the invention. I believe, however, that I am the first to employ either the momentum of the car or the car with a motor for compressing the air and also to so arrange the brakes that a downward pressure is applied to the wheels, all of which are governed or controlled by the motorman and automatically by the movement of the fender.

Having thus described the invention, what I claim as new, and desire to secure by Letters Patent, is—

1. In a street-car, the combination with a storage-tank, and means for charging the same with a fluid, of brakes for the wheels, mechanism for setting the brakes by fluid-pressure from the tank, comprising cylinders and pistons, a pipe connection from the cylinders to the tank, a valve in the pipe, a lever for actuating the valve, a hinged fender, a connection between the fender and valve-actuating lever, and adjustable means for supporting the fender in different positions and for limiting the movement of the valve-lever, substantially as described.

2. In a street-car, the combination with the body, of a swinging fender hinged thereto, an air-storage tank on the car, means for charging the tank, a series of brake-cylinders adjacent to each wheel of the car, pipes leading from the cylinders a main pipe leading from the tank and into which the cylinder-pipes lead, brake-shoes carried by the pistons of the several cylinders, a valve in the main pipe, an actuating-lever on the valve, adjustable means for limiting the movement of the lever and a connection from said lever to the fender, substantially as described.

3. In a street-car, the combination with the body of the car and truck, of a fender hinged to the car, an air-storage tank, a system of braking-cylinders arranged obliquely to the wheels, shoes actuated by the piston in the cylinder to engage the upper face of the wheel, pipes communicating with the braking-cylinders and the storage-tank, a valve for controlling said pipes, a lever for controlling the valve, means for normally holding the lever in position, and a connection between such lever and the fender substantially as described.

4. In a street-car, the combination with the car, of an air-storage cylinder carried thereby, a series of brake-cylinders adjacent to each wheel communicating with the storage-cylinder, a valve in said communication, a spring-actuated lever for controlling the valve, adjustable means for regulating the movement of the lever, a connection from the lever extending forward, a fender connected and supported by said connection, a switch, and a connection between the switch and the fender, substantially as described.

In testimony whereof I affix my signature in presence of two witnesses.

ALBERT L. KRAUS.

Witnesses:
CHAS. W. PARKER,
L. S. BACON.